United States Patent [19]

Fung et al.

[11] 4,344,130
[45] Aug. 10, 1982

[54] APPARATUS TO EXECUTE DMA TRANSFER BETWEEN COMPUTING DEVICES USING A BLOCK MOVE INSTRUCTION

[75] Inventors: Anthony K. Fung, Fountain Valley; Roger G. Mintzlaff, Tustin, both of Calif.

[73] Assignee: Sperry Corporation, New York, N.Y.

[21] Appl. No.: 79,209

[22] Filed: Sep. 26, 1979

[51] Int. Cl.³ .................... G06F 15/16; G06F 13/00
[52] U.S. Cl. .................................................. 364/200
[58] Field of Search ... 364/200 MS File, 900 MS File; 179/15 AL

[56] References Cited

U.S. PATENT DOCUMENTS

| | | | |
|---|---|---|---|
| 3,932,841 | 1/1976 | Deerfield et al. | 364/200 |
| 3,940,743 | 2/1976 | Fitzgerald | 364/200 |
| 3,969,704 | 7/1976 | Liebel | 364/900 |
| 4,035,777 | 7/1977 | Moreton | 364/200 |
| 4,050,096 | 9/1977 | Bennett et al. | 364/200 |
| 4,086,627 | 4/1978 | Bennett et al. | 364/200 |
| 4,099,236 | 7/1978 | Goodman et al. | 364/200 |
| 4,112,490 | 9/1978 | Pohlman et al. | 364/200 |
| 4,124,888 | 11/1978 | Washburn | 364/200 |
| 4,128,883 | 12/1978 | Duke et al. | 364/200 |
| 4,130,865 | 12/1978 | Heart | 364/200 |

OTHER PUBLICATIONS

Motorola M6800 Microprocessor Application Manual, pp. 3-8-3-28, 3-38, 1975.

*Primary Examiner*—James D. Thomas
*Attorney, Agent, or Firm*—G. Donald Weber, Jr.; Eugene T. Battjer

[57] ABSTRACT

There is shown and described a method and apparatus for using a "block move" instruction in a microprocessor to execute the direct memory access (DMA) data transfer function between a microprocessor and a minicomputer. The instruction permits an apparent data transfer in the memory of the microprocessor to be utilized to transfer data to the memory in the minicomputer. Little or no additional hardware over existing systems is required.

16 Claims, 4 Drawing Figures

APPARATUS TO EXECUTE DMA TRANSFER BETWEEN COMPUTING DEVICES USING A BLOCK MOVE INSTRUCTION

BACKGROUND

1. Field of the Invention

The invention is directed to minicomputer/microprocessor systems, in general, and to the transferring of data between the respective memories in these systems, in particular.

2. Prior Art

There are many known minicomputer systems and many known microprocessor systems available on the market. In many cases, it is desirable to interconnect the minicomputer and the microprocessor to utilize the inherent capabilities of each to enhance the capabilities of the other. For example, in the co-pending application entitled "CIRCULAR-QUEUE STRUCTURE" by A. K. Fung, Ser. No. 06/079,208, filed on Sept. 26, 1979, and assigned to the common assignee, there is described a system which interfaces a microprocessor and a minicomputer. Other such interfaces are known in the art and are not described herein.

One of the shortcomings of the known prior art interfacing arrangements, has been the limitation of transferring data between the respective memories of the systems. For example, it has previously been required, in most instances, to set up the source and the destination memory address in an address register, transfer information (data) from the source memory of one system to an intermediate register and then to transfer the same information from the register to the destination memory of the other system.

SUMMARY OF THE INVENTION

The invention described herein provides hardware and firmware control for transferring data in a DMA mode from the memory of a microprocessor to the memory of a minicomputer and vice versa. The hardware is relatively simple and comprises appropriate registers for storing data or addresses as well as a map key register which effectively expands the maximum size of the memory. The registers are well-known components which are readily available. The circuits are interconnected to transfer addresses and data from the address and data busses of the microprocessor to the address, data and control bus of the minicomputer without losing any information or impacting, in a negative manner, the operation of either system.

DESCRIPTION OF A PREFERRED EMBODIMENT

Figure 1:
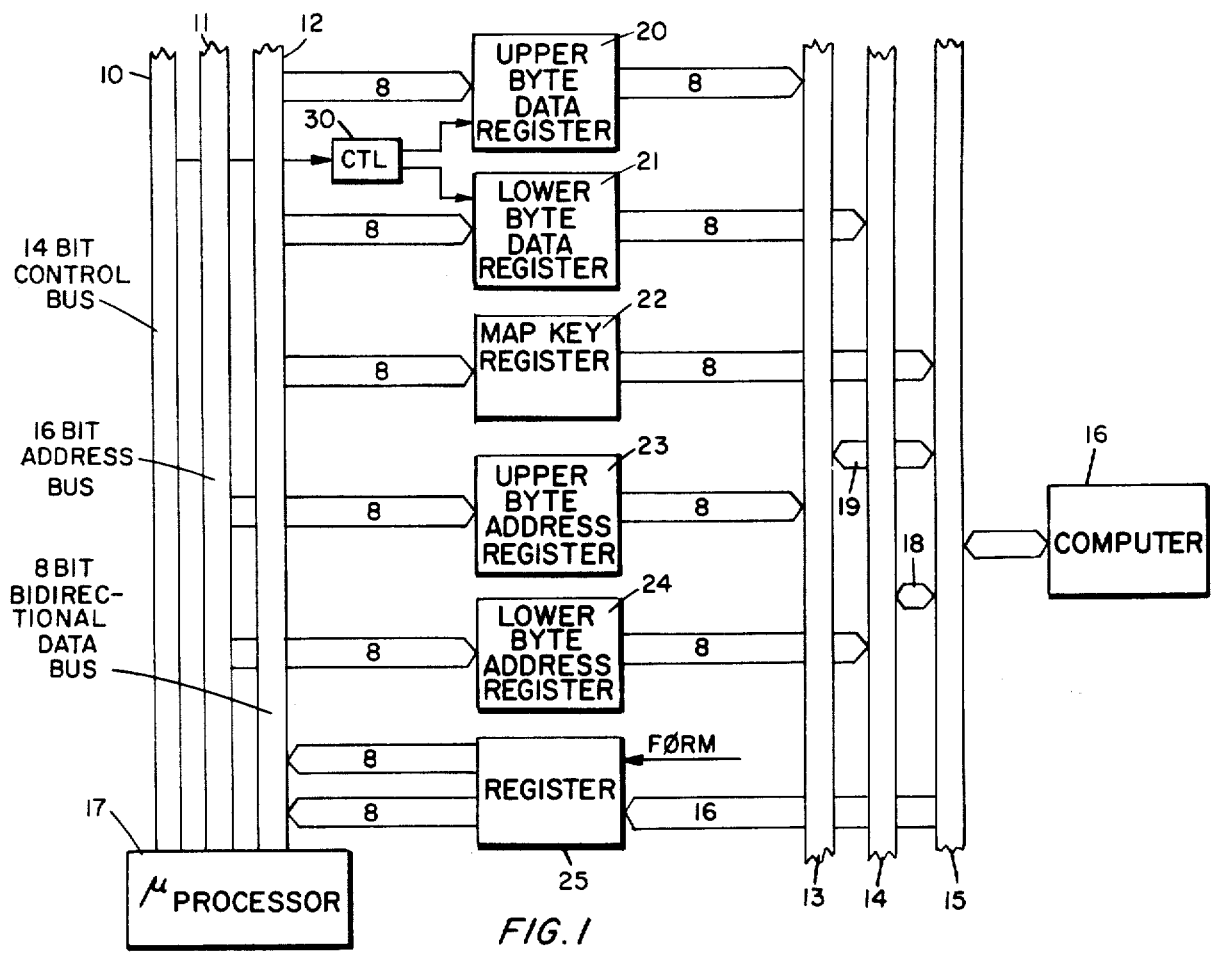
FIG. 1 is a functional diagram of the instant invention.

Referring now to FIG. 1, there is shown a functional block diagram of the instant invention. In this block diagram, the busses provided by the microprocessor 17 are a control bus 10, an address bus 11 and a data bus 12. In the particular example, bus 10 is a 14-bit control bus, bus 11 is a 16-bit address bus, and bus 12 is an 8-bit bidirectional data bus. Also, in one embodiment these busses can be associated with a Z80 microprocessor, although other systems are contemplated.

Also, in the preferred embodiment it is suggested that the minicomputer 16 may of the Sperry Univac V70 series. Again, other minicomputers are contemplated. Minicomputer 16 is connected to the upper and lower byte tri-state busses 13 and 14, respectively, and to the address, data and control bus 15. In the illustration, the upper and lower byte busses 13 and 14 are provided inasmuch as the microprocessor produces an 8-bit data word and the computer 16 operates upon a 16-bit data word. Consequently, two bytes of data are required from the microprocessor to form the appropriate data word for the computer.

Computer 16 is connected to bus 15 by a suitable connecting link 17 which may be drivers or the like. Likewise, busses 13 and 14 are connected to bus 15 by appropriate driver networks 19 and 18, respectively.

Upper and lower byte data registers 20 and 21 are connected to receive 8-bit data words from data bus 12 and to supply these 8-bit data words as the upper and lower bytes to busses 13 and 14, respectively. Appropriate control signals are applied by control logic 30 (CTL) which is controlled by control bus 10.

Upper and lower byte address registers 23 and 24 are connected to receive input address signals from bus 11 and to supply the output address signals to busses 13 and 14, respectively.

Map key register 22 is connected to receive mapping information from data bus 12 and to supply same to control bus 15 in order to control the mapping of the memory in computer 16. A suitable register 25 (e.g., a FIFO memory) is connected to receive information from bus 15 (16-bit words) and supply the information to bus 12 (two 8-bit bytes). The details of such a register are described in co-pending application CIRCULAR QUEUE STRUCTURE by A. K. Fung, noted supra.

In operation, the appropriate data bits are stored in the upper and lower byte data registers 20 and 21 by the microprocessor via data bus 12. Subsequently, appropriate upper and lower byte address bits are supplied to registers 23 and 24 by the microprocessor via bus 11. Also, the map key register 22 is set to the appropriate memory page by the microprocessor along bus 12. When the "block move" instruction is executed by the microprocessor, the information is transferred as described hereinafter. To the microprocessor, the operation is equivalent to relocating data from one portion of the microprocessor memory to another portion thereof. However, the data is actually redirected from the microprocessor memory and transferred in a direct memory access operation to the memory of the computer.

Conversely, in a pre-fetch or DMA operation, data can be transferred directly from computer 16 to the microprocessor via register 25. That is, the 16-bit word is applied to register 25 by bus 15. The information is then supplied to bus 12 as two 8-bit bytes and stored in the memory of the microprocessor. This operation is described in detail in the co-pending application of Fung noted above.

Figure 2:
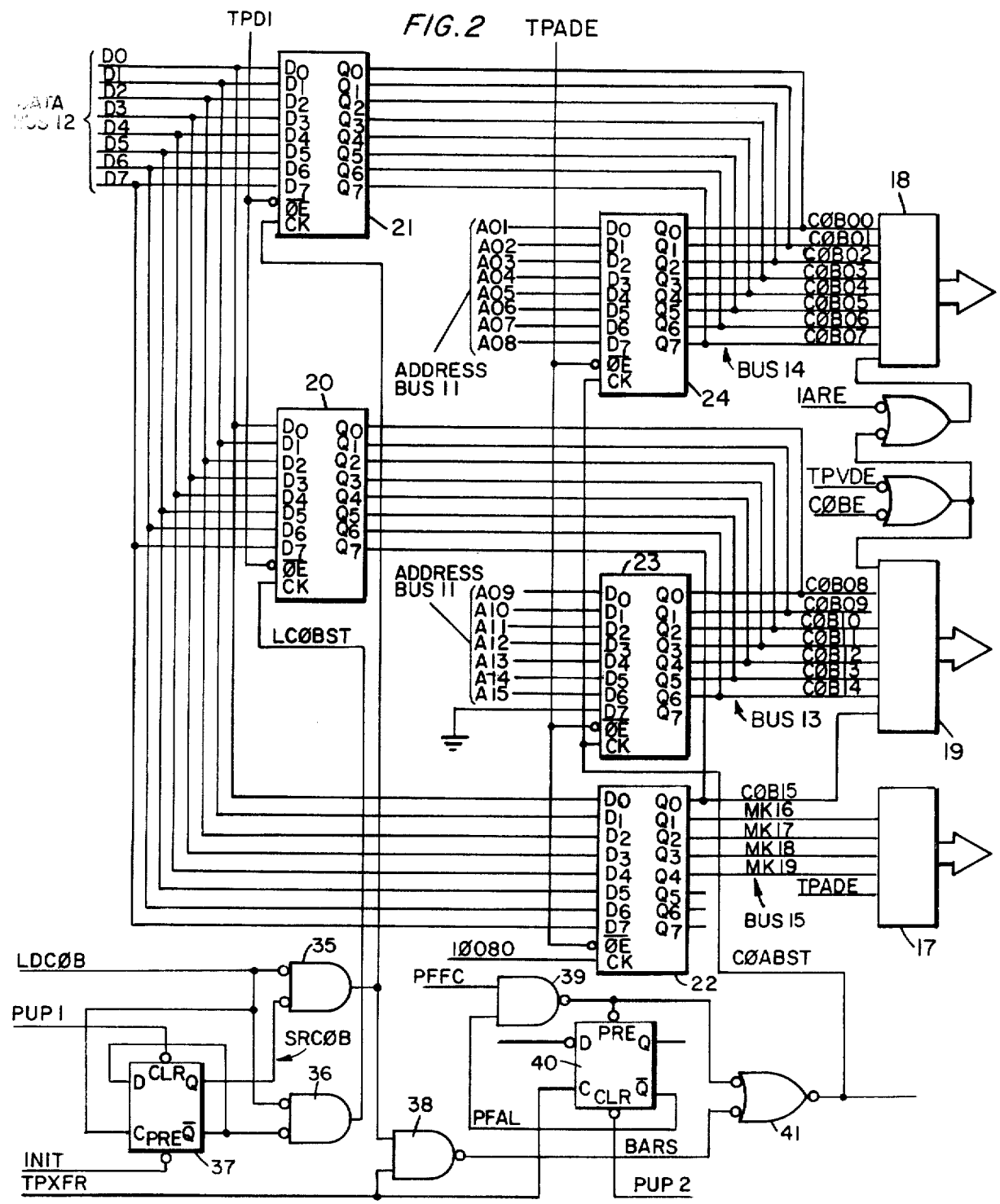
FIG. 2 is a schematic diagram of the memory transfer circuitry of the instant invention.

Referring now to FIG. 2, there is shown a more detailed diagram of the circuitry of the instant invention. For example, upper and lower byte registers 20 and 21 are connected to the data bus 12. Likewise, the inputs of map key register 22 are also connected to the same data bus. The address bus 11 is connected to the inputs of upper and lower byte address registers 23 and 24, respectively. The output terminals of the lower byte data register 21 and the lower byte address register 24 are connected together and to bus 14. Similarly, the output terminals of upper byte data register 20 and upper byte address register 23 are connected together and to bus 13. The output terminals which form busses 13, 14 and 15 are connected to appropriate driver networks 17, 18 and 19 and to the minicomputer bus 15 which is then connected to minicomputer 16.

In the instant embodiment of the invention, the circuit arrangement utilized is desirable especially inasmuch as computer 16 is a 16-bit system while the microprocessor involved is an 8-bit system. Consequently, it is necessary for two bytes of 8 bits each from the microprocessor to be combined to form a 16-bit word for computer 16. Thus, the data bits D0 through D7 are applied to both the upper and lower byte data registers 20 and 21, respectively, via data bus 12. However, the bits D0 through D7 are selected by the respective registers 20 and 21 at consecutive time periods as controlled by the signals supplied to the clock (CK) terminals of the respective registers. Thus, bits D0 through D7 are first entered into lower byte data register 21 wherein the bits are latched and stored. Subsequently, the next 8-bit byte is applied as data bits D0–D9 to upper byte data register 20 wherein that information is then latched and stored. The output bits C$\phi$B00 through C$\phi$B07 are supplied from lower byte register 21 to bus 14 and then to driver circuit 18. Output bits C$\phi$B08 through C$\phi$B15 are supplied from upper byte register 20 via bus 13 to driver circuit 19. These signals are then supplied from driver circuits 18 and 19 to bus 15 (FIG. 1) where the bits are assembled in a 16-bit format and supplied to computer 16.

Likewise, the data bits D0 through D7 are supplied to map key register 22 and, thence through bus 15 to the minicomputer 16 as noted above. It is noted that map key register 22 permits appropriate mapping arrangements so that a greater memory capacity can be utilized in the system.

In a similar manner, upper and lower byte address registers 23 and 24 are connected to address bus 11 to receive the address signals. In particular, signals A09 through A15 are supplied to upper byte address register 23 while signals A01 through A08 are supplied to lower byte address register 24. The output terminals of registers 23 and 24 are connected to driver registers 19 and 18 via busses 13 and 14, respectively.

In order to assure proper control, it is noted that the data-ready (DRY) status is controlled by the DRY circuitry (not shown) which in turn generates the trap data input signal (TPDI) which is supplied to enable terminals ($\phi$E) of registers 20 and 21. Thus, only during the DRY cycle can data be transferred from registers 20 and 21 to the respective data busses 13 and 14.

Conversely, only during the function-ready (FRY) condition are the address registers 23 and 24 and the map register 22 enabled. The FRY condition, in turn, generates the trap address enable signal (TPADE) which is then supplied to the enable terminals ($\phi$E) of registers 22, 23 and 24 wherein these registers are enabled to place the appropriate data onto busses 13 and 14, respectively. Thus, it is clear that the FRY and DRY control circuits produce enabling signals at different times whereby the data or address registers are enabled at different times.

To control the clocking, and, thus, the loading of the data registers, the load control circuit is provided. This circuit includes flip-flop 37, inverting AND gates 35 and 36. The clear (CLR) terminal of flip-flop 37 is connected to receive the pull-up input signal PUP1. The initialization signal (INIT) is supplied to the pre-set (PRE) input terminal of flip-flop 37. With the application of this signal, flip-flop 37 is pre-set to the condition wherein the Q output terminal produces a high level signal and the $\overline{Q}$ terminal produces a low level signal. These signals are applied to one input terminal of each of the inverting NAND gates 35 and 36. The other input terminals of gates 35 and 36 are connected to receive the load controller output buffer control signal (LDC$\phi$B). Inasmuch as the signal LDC$\phi$B is supplied to one input of each of gates 35 and 36, both gates are placed in the same condition relative to this signal. However, the output signals supplied by flip-flop 37 are the inverse of one another wherein gates 35 and 36 are in the opposite true logic state. Therefore, with the application of the initialization signal, the gates are set in mutually opposite states. The application of the load signal to gates 35 and 36 causes one of the gates, typically gate 36, to become operative wherein register 20 is clocked and latches and transfers the signals therein. At the same time, the LDC$\phi$B signal is supplied to the clock input C terminal of flip-flop 37 and causes it to toggle. That is, the signal levels at the Q and $\overline{Q}$ output terminals are switched wherein the state of gates 35 and 36 are altered and the output signals produced thereby are essentially inverted. Consequently, register 21 now becomes operative and register 20 is inoperative in terms of receiving and storing signals therein.

Similarly, the address bus registers are activated by the application of the C$\phi$ABST signal which is produced by inverting NOR gate 41. One input terminal of gate 41 is connected to the output terminal of inverting AND gate 38 which receives the trap transfer (TPXFR) signal from the microprocessor to indicate DMA data transfer and also the output signal from gate 35. The trap transfer signal is used only when DMA data is required to be transferred.

In the absence of the TPXFR signal, gate 38 does not produce an output signal for causing DMA operation and, therefore, no DMA address is entered into address registers 23 and 24. In addition, gate 41 receives an output signal from inverting AND gate 39 which receives the pre-fetch input signal (PFFC) as well as the $\overline{Q}$ signal from flip-flop 40. Flip-flop 40 receives the PUP2 signal at the clear (CLR) input terminal. The C input terminal of flip-flop 40 receives the TPXFR signal while the D terminal receives the read/write command (CWR) signal which during the initial DMA start-up cycle "arms" gate 39. With the pre-fetch signal (PFFC) active for the first DMA cycle, the first word will be fetched from the computer memory as described hereinafter. The pre-set terminal (PRE) of flip-flop 40 is connected to the output terminal of gate 39 and the second input terminal gate 41. This has the effect of "disarming" latch 40 after the first DMA cycle.

With the application of the TPXFR signal, the status of gates 38 and the $\overline{Q}$ output of flip-flop 40 are controlled. In addition, the signal level at one input terminal of gate 41 is established via gate 38. With the operation of flip-flop 40, the status of gate 39 is also controlled. With the application of the pre-fetch signal (PFFC), gate 39 provides signals to flip-flop 40 and gate 41 which control the output signal produced by gate 41 and supplied to registers 23 and 24 to establish the clocking operation relative thereto.

Figure 3:
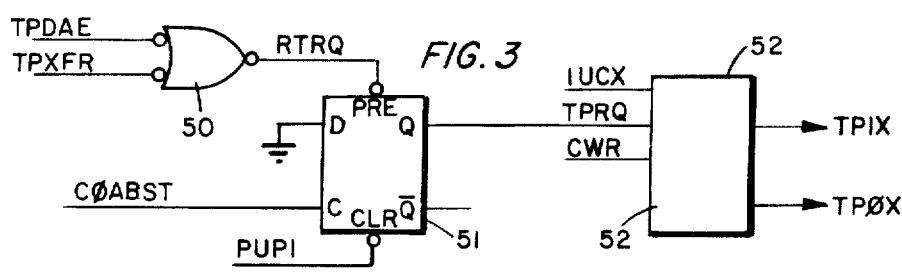
FIG. 3 is a schematic diagram of interfacing and control circuitry of the instant invention.

Referring now to FIG. 3, there is shown a detailed circuit diagram for the computer-oriented circuitry. In particular, FIG. 3 shows the trap logic as well as the execute command and data output decode interfacing circuitry. In particular, inverting NOR gate 50 receives the TPDAE and the trap transfer (TPXFR) signals at the input terminals thereof. These signals are supplied by the microprocessor and the computer control circuitry. Gate 50 supplies the reset trap request output signal (RTRQ) to the pre-set terminal of flip-flop 51. The CLR terminal of flip-flop 51 receives the PUP1 signal noted above. The D input terminal of flip-flop 51 is grounded while the C input terminal receives the C$\phi$ABST signal from gate 41 in FIG. 2. The $\overline{Q}$ output terminal of flip-flop 51 is not connected while the Q output terminal is connected to supply the trap request TPRQ signal to one input terminal of the trap logic circuit 52 which together with CWR, controls whether information is to be transferred to or from computer 16 by the trap-in (TPIX) and the trap-out (TP$\phi$X) signals respectively. In addition, trap logic circuit 52 is connected to receive the interrupt clock IUCX signal and the command read/write signal (CWR) from the computer receiver interface circuitry (not shown). The IUCX signal is used to synchronize the data transfer with bus 15. The output terminals of trap logic circuit 52 produce the signal TPIX which is supplied to computer 16 when information data is to be transferred from the microprocessor to the computer and the output signal TP$\phi$X which is supplied to the computer 16 when data is to be transferred from the computer memory to the microprocessor.

Figure 4:
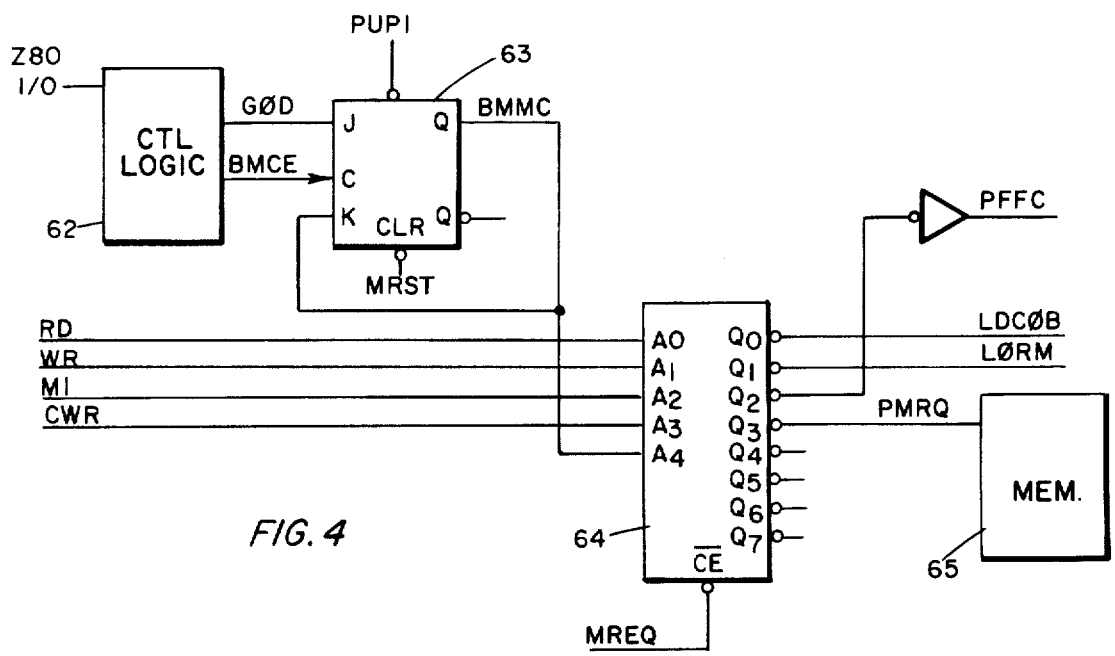
FIG. 4 is a schematic diagram of control and decode logic circuitry of the instant invention.

Referring now to FIG. 4, there is shown a detailed circuit diagram of the microprocessor bus control PROM and the address decode logic used therewith. In particular, control logic circuit 62 receives control signals from the microprocessor I/O port. Control logic circuit 62 supplies the gated output signal (G$\phi$D) to the J terminal of flip-flop 63 and the block move control enable signal (BMCE) to the clock or toggle input terminal C of flip-flop 63. The pre-set terminal receives the PUP1 signal while the clear (CLR) terminal receives the master reset signal (MRST). The Q output terminal of flip-flop 63 is returned to the K input terminal thereof and, as well, to terminal A4 of the bus control PROM 64. The A3 terminal of PROM 64 receives the CWR signal while the A0 and A2 terminals receive the read (RD) and M1 signals, respectively. The write (WR) signal is supplied to terminal A1 of PROM 64. The output terminals of PROM 64 are connected to produce, on terminals Q0 through Q3, the signals LDC$\phi$B, F$\phi$RM, PFFC and PMRQ, respectively. The PFFC signal is the pre-fetch signal noted relative to FIG. 2. The LDC$\phi$B signal is supplied to gates 35, 36 and 37 in FIG. 2. The F$\phi$RM signal is supplied to the computer output buffer interface circuitry and controls operation of register 25 (see FIG. 1) as is described in the co-pending patent application of A. K. Fung noted supra. The PMRQ signal is supplied to an input terminal of memory 65.

Basically, the PMRQ signal selectively enables or disables microprocessor memory 65 such that data is not returned to the local memory during a DMA transfer or vice versa. That is, if the local memory is not disabled, the circuit acts as a "block-move" circuit and a block of data is relocated within the local memory. In this event, data is not transferred to the computer 16. In addition, operation of PROM 64 selectively causes the microprocessor to interface directly with the memory in the computer because the F$\phi$RM signal enables the tri-state drivers in register 25.

Referring to Table I, there is shown the basic operation of the bus control PROM 64. This PROM receives five (5) inputs and, thus, must operate on 32 combinations of signals. These combinations are numbered 0 (00000) to 31 (11111). These input signal combinations represent addresses for the PROM. The output signals represent the contents of the respective addresses which are listed. These output signals control the operation of the interfacing circuit. For example, combination 17 has address 10001 and output 1100. This combination indicates that input signals BMMC and RD are binary ones and the other input signals are binary zeroes. The output signals PMRQ and PFFC are binary ones and the other output signals are binary zeroes. In this embodiment, the input signals are based on positive logic (i.e., 1 = true) while the output signals are based on negative logic (i.e., 1 = false).

More particularly, this condition indicates that latch 63 has been set to select the phantom memory and the block move instruction (i.e., BMMC = 1). Also, the microprocessor has selected the read condition (i.e., RD = 1). Conversely, the write (WR), operation code fetch (M1) and DMA transfer direction (CWR) are not selected (i.e., the microprocessor is not doing an operation code fetch and the DMA transfer is from the computer and the microprocessor). As a consequence the contents of this PROM address (1100) produces the signal (F$\phi$RM) which enables the register 25 for DMA transfer and at the same time the LDC$\phi$B triggers another DMA fetch cycle from computer 16. Thus, the microprocessor memory can receive data from the computer memory. Also, in response to the PFFC = 1 signal, gate 41 is forced to produce the signal C$\phi$ABST which stores the microprocessor registers in address registers 23 and 24 and sets flip-flop 51 to place trap logic circuit 52 in the TP$\phi$X state. With these conditions, computer 16 can write data into the register 25 for the next DMA operation. This completes the fetch cycle of the DMA operation. On the next microprocessor Z80 cycle, the PROM 64 address (10010) indicates the microprocessor is performing a write cycle (WR). From the PROM 64 output (0111) PMRQ = 0 and enables the microprocessor destination memory to receive the data from register 25 thus completing the store cycle of the DMA operation. It is clear, of course, that the microprocessor operation has not been particularly impacted by the DMA operation. In fact, data has been transferred directly from the computer 16 memory to the microprocessor 17 memory without specific microprocessor control. In short, during the fetch operation of the DMA cycle, the microprocessor performs a fetch cycle from its local memory while the bus control PROM 65 enables register 25, disables the local memory 65, and places the data from register 25 onto bus 12 for the microprocessor to pick up. At the same time, the next DMA word is fetched from the memory of minicomputer 16. During a store cycle, the microprocessor writes the data into the local memory to receive the data. It must be noted that the microprocessor only "knows" of and operates in its own memory space, e.g. memory 65, and its own domain. At no time does the microprocessor realize that a DMA operation is being performed between two separate systems. In this manier, software programs and hardware circuits can be designed in a simpler fashion. The same is true for the minicomputer. Likewise, in the "pre-fetch" operation, data in a specified location in the computer is transferred to the microprocessor without specific microprocessor action. In this operation, the microprocessor supplies the signal 00001 (combination 2) to the PROM 64 thereby indicating that a read (RD) operation is to occur. The PROM output signal 0011 enables microprocessor memory 65 (PMRQ=0) and, as well, enables gate 39. As a result, gate 41 produces the C$\phi$ABST signal which sets flip-flop 51 to produce the TP$\phi$X signal wherein computer 16 outputs data. In the meantime, computer 16 has caused the microprocessor to read an address which is coincident with the first DMA address in the minicomputer memory. The address and contents are applied to busses 15 and 12, respectively. However, the load signal (LDC$\phi$B=1) does not enable the data registers 20, 21 wherein the data is not actually transferred from the microprocessor memory. However, the C$\phi$ABST signal (see above) has enabled the address registers 23, 24. The address, thus, stored in registers 23, 24 points to the address in the computer memory whereby data is transferred to the register 25 from the computer memory.

In transferring data from the microprocessor to the computer (combinations 25 and 26) a two-step operation is utilized. The input signal 11001 to PROM 64 produces the output signals 0111. The PMRQ=0 signal enables the microprocessor memory 65 which then permits selected data to be placed on bus 12. Thereafter, the input signal 11010 produces the PROM 64 output signals 1110. The LDC$\phi$B=0 signal causes registers 20, or 21 to be loaded in accordance with the description supra.

Thus, the microprocessor operates without special instructions from the computer and vice versa. Rather, information is merely "dumped onto the busses" and selectively directed in accordance with the operation of the interface circuitry as controlled by PROM 64.

the information is transferred to the computer 16 via the interfacing network. That is, data is transferred to the appropriate registers (20, 21) for transfer to the computer. The address for the data is also transferred by appropriate registers (23, 24) to the computer in a similar fashion. The map key register 22 selects that portion of the computer memory to which the data is to be transferred. In the embodiment shown and described, the microprocessor is an 8-bit machine or system while the computer is a 16-bit machine or system. Consequently, data to be supplied to the computer is provided by the microprocessor in two 8-bit bytes. These bytes are identified as the upper and lower bytes. In this embodiment, the addresses of the bytes are also transferred in 8-bit bytes to be utilized in the 16-bit machine. However, in order to expedite the transfer and to reduce the number of components which are required, the address information which is to be transferred to the computer is shifted by one bit in the address registers 23 and 24. For example, register 24 receives the address bits A01 through A08. These bits are supplied to the computer bus as the computer address bits C$\phi$B00 through C$\phi$B07. Similarly, address bits A09–A15 are transferred via register 23. The shifting of address but A00–A15 has the effect of reducing the addresses supplied to the computer by one-half ($\frac{1}{2}$), or, in other words, packing two 8-bit bytes into a 16-bit word.

By referring to Table II is seen that the omission or dropping of the least significant bit (A00) in the address registers has the effect of transferring the two consecutive data bytes into the same address in the computer memory. This circuit arrangement effects a substantial saving in the circuitry components required to transfer the data from the microprocessor to the computer.

TABLE I

| | B M M C | C W R | M 1 | W R D | R 0 | P M R F C M | P F O R M | F O C $\phi$ B | L O C $\phi$ B | | B M M C | C W R | M 1 | R D | P M R Q | P F C M | F R $\phi$ M | L D C $\phi$ B |
|---|---|---|---|---|---|---|---|---|---|---|---|---|---|---|---|---|---|---|
| 0 | 0 | 0 | 0 | 0 | 0 | 0 | 1 | 1 | 1 | 16 | 1 | 0 | 0 | 0 | 1 | 1 | 1 | 1 |
| 1 | 0 | 0 | 0 | 0 | 1 | 0 | 0 | 1 | 1 | 17 | 1 | 0 | 0 | 0 | 1 | 1 | 1 | 0 | 0 |
| 2 | 0 | 0 | 0 | 1 | 0 | 0 | 1 | 1 | 1 | 18 | 1 | 0 | 0 | 1 | 0 | 0 | 1 | 1 | 1 |
| 3 | 0 | 0 | 0 | 1 | 1 | 0 | 1 | 1 | 1 | 19 | 1 | 0 | 0 | 1 | 1 | 1 | 1 | 1 | 1 |
| 4 | 0 | 0 | 1 | 0 | 0 | 0 | 1 | 1 | 1 | 20 | 1 | 0 | 1 | 0 | 0 | 1 | 1 | 1 | 1 |
| 5 | 0 | 0 | 1 | 0 | 1 | 0 | 1 | 1 | 1 | 21 | 1 | 0 | 1 | 0 | 1 | 0 | 1 | 1 | 1 |
| 6 | 0 | 0 | 1 | 1 | 0 | 0 | 1 | 1 | 1 | 22 | 1 | 0 | 1 | 1 | 0 | 0 | 0 | 0 | 0 |
| 7 | 0 | 0 | 1 | 1 | 1 | 0 | 1 | 1 | 1 | 23 | 1 | 0 | 1 | 1 | 1 | 1 | 1 | 1 | 1 |
| 8 | 0 | 1 | 0 | 0 | 0 | 0 | 1 | 1 | 1 | 24 | 1 | 1 | 0 | 0 | 0 | 1 | 1 | 1 | 1 |
| 9 | 0 | 1 | 0 | 0 | 1 | 0 | 1 | 1 | 1 | 25 | 1 | 1 | 0 | 0 | 1 | 0 | 1 | 1 | 1 |
| 10 | 0 | 1 | 0 | 1 | 0 | 0 | 1 | 1 | 1 | 26 | 1 | 1 | 0 | 1 | 0 | 1 | 1 | 1 | 0 |
| 11 | 0 | 1 | 0 | 1 | 1 | 0 | 1 | 1 | 1 | 27 | 1 | 1 | 0 | 1 | 1 | 1 | 1 | 1 | 1 |
| 12 | 0 | 1 | 1 | 0 | 0 | 0 | 1 | 1 | 1 | 28 | 1 | 1 | 1 | 0 | 0 | 1 | 1 | 1 | 1 |
| 13 | 0 | 1 | 1 | 0 | 1 | 0 | 1 | 1 | 1 | 29 | 1 | 1 | 1 | 0 | 1 | 0 | 1 | 1 | 1 |
| 14 | 0 | 1 | 1 | 1 | 0 | 0 | 1 | 1 | 1 | 30 | 1 | 1 | 1 | 1 | 0 | 1 | 1 | 1 | 1 |
| 15 | 0 | 1 | 1 | 1 | 1 | 0 | 1 | 1 | 1 | 31 | 1 | 1 | 1 | 1 | 1 | 1 | 1 | 1 | 1 |

Thus, there is shown and described a circuit which permits direct memory accessing (DMA) between a microprocessor and a computer memory. That is, data in the memory of the microprocessor is placed on the data busses 11 and 12 of the microprocessor under control of and in response to signals within the microprocessor. Depending upon other control signals which are supplied to the bus control PROM 64 and latch 63,

TABLE II

| MICROPROCESSOR ADDRESS | | | | COMPUTER ADDRESS | |
|---|---|---|---|---|---|
| A0Z | A01 | A00 | | C$\phi$B01 | CB00 |
| (0) 0 | 0 | 0 | (0) | 0 | 0 |
| (1) 0 | 0 | 1 | | 0 | 0 |
| (2) 0 | 1 | 0 | (1) | 0 | 1 |
| (3) 0 | 1 | 1 | | 0 | 1 |
| (4) 1 | 0 | 0 | (2) | 1 | 0 |
| (5) 1 | 0 | 1 | | 1 | 0 |
| (6) 1 | 1 | 0 | (3) | 1 | 1 |
| (7) 1 | 1 | 1 | | 1 | 1 |

Thus, there has been shown and described a preferred embodiment of the instant invention. In this embodiment, a DMA operation is permitted between a microprocessor and a computer. This concept makes use of the existing firmware, i.e., "block data move" instruction in the microprocessor. It permits a DMA operation to be effected through standard registers. However, this approach permits the data transfer to be effected from memory-to-memory across a boundary between two separate systems or machines. In effect, the microprocessor operates in such a fashion that the computer memory appears to be a part of the microprocessor memory. Therefore, whenever a block data move or manipulation is completed within the microprocessor, the DMA operation is also completed vis-a-vis the computer. This operation, as performed by the subject invention, permits the transfer of data when the requisite address and data identification are available in the microprocessor. However, it must be recognized that the microprocessor does not "transfer" data to the computer, per se. That is, the microprocessor places data onto a data bus as if for an internal operation. However, other logic signals are supplied to a PROM which effectively diverts the data from the bus to an interfacing circuit and, thence, to the computer. The computer, likewise, places data onto the microprocessor data bus via interfacing circuitry. As a result, the circuitry in the computer and microprocessor are altered in only insignificant ways but the very powerful data transfer capability is obtained.

It is clear that the embodiment shown and described herein utilizes certain circuit components. Those skilled in the art may develop alternative circuitry using different circuit components. However, any modifications to the instant invention which fall within the purview of this description are intended to be included herein as well. Thus, any modification based upon rearrangement of the components or utilization of different components as the result of engineering design preferences, is intended to be included herein as well. The specific circuit structures shown and described are intended to be illustrative only. The specific circuits are not intended to be limitative of the invention. Rather, the scope of the invention is limited only by the claims appended hereto.

Having thus described a preferred embodiment of the instant invention, what is claimed is:

1. In combination,
   first computing means having memory means associated therewith,
   said first computing means including a "block move instruction" capability,
   second computing means having memory means associated therewith,
   first register means for selectively transferring data from said first computing means to said second computing means,
   second register means for selectively transferring data from said second computing means to said first computing means,
   first bus means connected to said first computing means and each of said first and second register means for transferring data,
   second bus means connected to said second computing means and each of said first and second register means for transferring data, and
   control means for controlling the operation of said first and second register means and said first and second computing means,
   said control means includes means responsive to signals from said first computing means to provide an indication signal to indicate that said "block move instruction" is being performed by said first computing means,
   said control means further includes means responsive to signals from said second computing means and to said indication signal to indicate to said control means that said second computing means desires to transfer information to or from said first computing means when said "block move instruction" is being performed by said first computing means, whereby data in said first computing means is transferred directly to said second computing means, or vice versa, depending upon which of said first and second register means is enabled for transferring data without the requirement of request and acknowledge signals.

2. The combination recited in claim 1 wherein
said control means includes stored memory means for providing specified control signals in response to input signals.

3. The combination recited in claim 1 wherein
said first register means includes data register means and address register means for transferring data and address information, respectively.

4. The combination recited in claim 1 wherein
said control means includes logic circuit means for selectively enabling said first and second register means.

5. The combination recited in claim 1 wherein
said first computing means comprises a microprocessor, and
said second computing means comprises a minicomputer system.

6. The combination recited in claim 2 wherein
said stored memory means comprises a read-only memory which selectively produces output control signals as a function of input control signals which are supplied as address signals.

7. The combination recited in claim 6 wherein
said output control signals are supplied to each of said first and second register means to selectively enable only one of said first and second register means at a time.

8. The combination recited in claim 3 wherein
said data register means includes upper and lower data byte registers to operate on selected byte portions of a data word to be transferred to said second computing means.

9. The combination recited in claim 3 wherein
said address register means shifts the address information supplied from said first computing means by at least one bit in order to increase the data packing in said second computing means.

10. The combination recited in claim 9 wherein,
said first and second computing means have different word length operating characteristics and said address register means shifts the address information sufficiently to permit interaction of said first and second computing means.

11. The combination recited in claim 10 wherein,
said first computing means has a word length of 8-bit and said second computing means has a word length of 16-bits.

12. The combination recited in claim 1 including memory map register means for mapping the memory means in said second computing means.

13. The combination recited in claim 1 wherein, said block move instruction permits a large amount of information to be moved from one location in memory to another location in memory.

14. The combination recited in claim 13 wherein, said large amount of information is transferred directly from the memory means associated with said first computing means to the memory means associated with said second computing means, or vice versa, depending upon which of said first and second register means is enabled for transferring data without loss of integrity of said information or the remainder of the information stored in either memory.

15. The combination recited in claim 1 wherein, said control means includes latch means for producing a signal indicative of the performance of said block move instruction.

16. The combination recited in claim 1 wherein, said control means selectively produces a disable signal which disables the memory associated with said first computing means when information is to be transferred therefrom to said second computing means.

* * * * *